United States Patent [19]

Puleo

[11] 3,917,332
[45] Nov. 4, 1975

[54] VEHICLE FENDERS OF RESILIENT MATERIAL

[75] Inventor: Guiseppe Puleo, Turin, Italy

[73] Assignee: Fiat Societa Per Azioni, Turin, Italy

[22] Filed: June 19, 1974

[21] Appl. No.: 480,765

[30] Foreign Application Priority Data
June 25, 1973 Italy .................................. 68884/73

[52] U.S. Cl. ................ 293/63; 293/71 R; 296/31 P
[51] Int. Cl.² ........................................ B60R 19/08
[58] Field of Search ........... 296/31 P; 293/1, 60, 63, 293/70, 71 R, 81, 98

[56] References Cited
UNITED STATES PATENTS

| | | | |
|---|---|---|---|
| 2,188,082 | 1/1940 | Imhofe | 293/71 R |
| 3,493,257 | 2/1970 | Fitzgerald et al. | 293/71 R |
| 3,583,756 | 6/1971 | Wilfert | 293/63 X |
| 3,734,557 | 5/1973 | McKenzie | 293/71 R |
| 3,744,835 | 7/1973 | Carbone | 293/1 |
| 3,782,767 | 1/1974 | Moore | 293/60 X |

Primary Examiner—John J. Love
Attorney, Agent, or Firm—Sughrue, Rothwell, Mion, Zinn & Macpeak

[57] ABSTRACT

A resilient front or rear fender for a motor vehicle has the form of an annular capping of elastomeric material applied to the periphery of the front or rear surface of the vehicle, the capping having ogival cavities in its surface facing the vehicle body so that the fender absorbs high speed impact energy and exhibits relatively low rigidity to low speed collisions. Vertical drainage channels may be provided on the fender surfaces facing the body to conduct foreign matter away from the radiator and headlamp assembly surrounded by the capping.

3 Claims, 4 Drawing Figures

U.S. Patent  Nov. 4, 1975  3,917,332
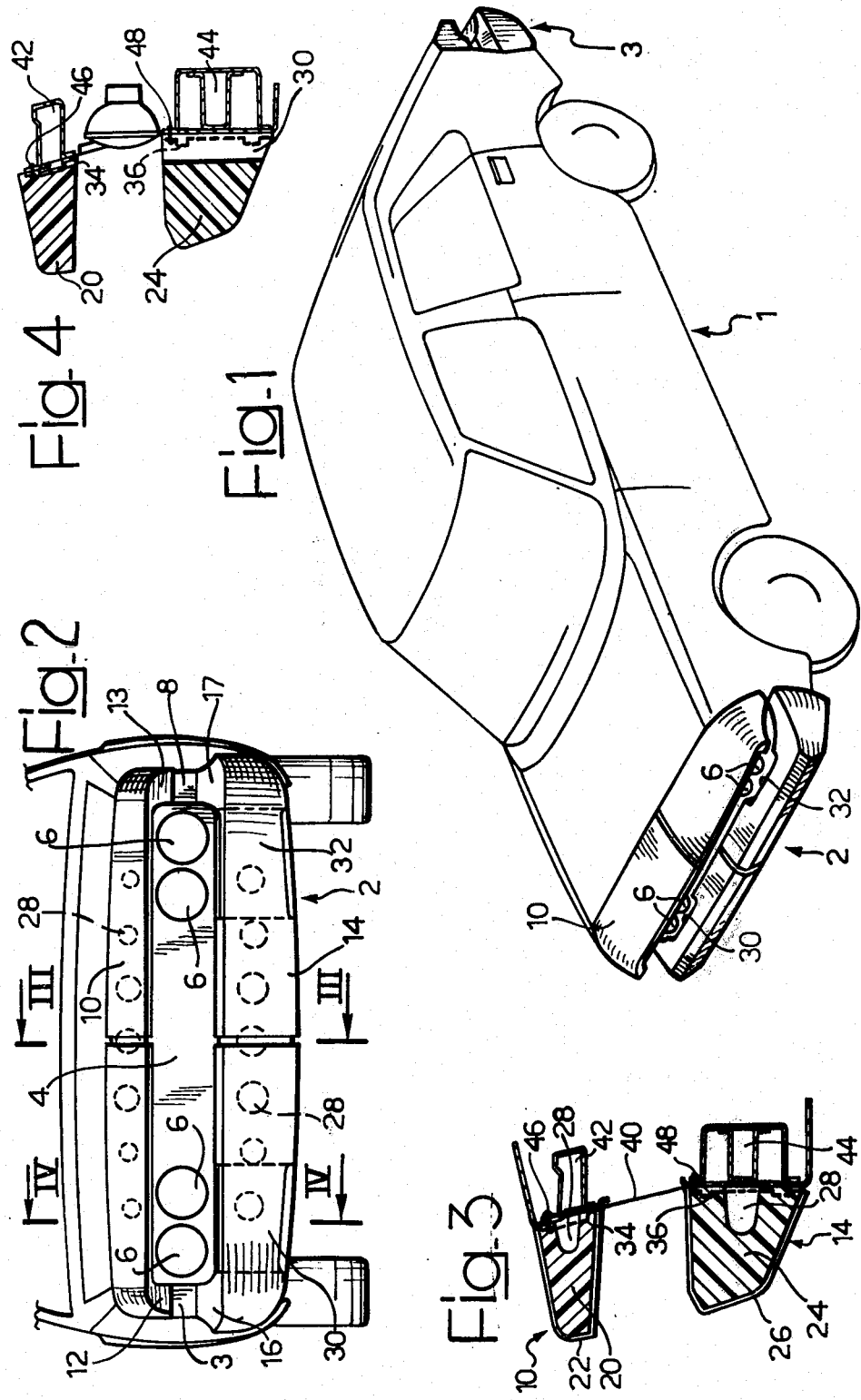

VEHICLE FENDERS OF RESILIENT MATERIAL

BACKGROUND OF THE INVENTION

The present invention relates to resilient front or rear fenders of elastomeric material for use on motor vehicles, in particular in automobiles.

Fenders having resilient properties are already known for the purpose of absorbing at least part of the energy of a collision. Such fenders serve a useful purpose in absorbing the energy of low speed collisions.

More particularly, fenders are known which contain fluid under pressure for absorbing impact energy. Such fenders are, however, expensive to construct and are complex, having, inter alia, to be provided with valves and other parts associated with the fluid filling. Also known are fenders formed almost entirely of elastomeric materials, and fenders having both solid and fluid-filled portions.

Fenders constituted of elastomeric materials have, however, the disadvantage of covering only a limited surface of a vehicle or, if covering an extensive surface, are fairly complex to manufacture and exhibit substantially uniform rigidity towards collisions which occur at different speeds of the motor vehicle.

In practice it is required that resilient fenders, besides protecting the vehicle on which they are mounted, should also serve to reduce as far as possible the injury caused to pedestrians who may be struck by the vehicle at low speed. For this purpose the fenders should extend as far as possible over the rear and front end surfaces of the vehicle or at least around the periphery of each end surface. More importantly, it is desirable that the fenders should have high rigidity towards collisions at high speed in order to absorb high speed impact energy effectively, while at the same time exhibiting a relatively low rigidity to collisions at low speeds so as to inflict as little injury as possible upon pedestrians.

An object of the present invention is to provide a fender capable of meeting the abovementioned requirements.

SUMMARY OF THE INVENTION

The present invention provides a resilient front or rear fender for motor vehicles comprising at least one element of porous elastomeric material, in particular expanded polyurethane foam, having a flexible covering and an internal reinforcement, the fender being arranged transversely on an end surface of the motor vehicle wherein the improvement resides in the said element having at least one of the following:

a. means defining a plurality of cavities of substantially ogival form with their axes directed substantially parallel to the longitudinal plane of symmetry of the vehicle, and with their bases disposed in the surface of the element which faces the motor vehicle body in the installed position of the fender;

b. means defining a plurality of through channels which traverse the element over its entire height on the surface of the latter which faces towards the vehicle body in the installed position of the fender.

BRIEF DESCRIPTION OF THE INVENTION

The invention will now be further described, by way of example, with reference to the accompanying drawings, in which:

FIG. 1 is a diagrammatic perspective view of a motor vehicle on which are mounted a front and a rear fender according to a preferred embodiment of the invention;

FIG. 2 is a front elevational view of a front fender according to the said preferred embodiment of the invention;

FIG. 3 is a cross section of the front bumper in the longitudinal plane of symmetry of the motor vehicle passing through the line III—III of FIG. 2, and FIG. 4 is a cross section of the front fender in a longitudinal plane of the motor vehicle passing through the line IV—IV of FIG. 2.

DETAILED DESCRIPTION OF THE ILLUSTRATED EMBODIMENT

FIG. 1 shows an automobile upon which are mounted a front fender 2 and a rear fender 3 according to the invention.

With reference to FIG. 2, which shows the front fender 2 in detail, this is constructed substantially in the form of a substantially annular moulding or capping which in its entirety covers the periphery of the front end surface of the automobile, leaving free a central zone 4 in which are situated the headlamps 6 and if necessary a radiator grille (not shown) for the entry of cooling air into the engine. At the lateral ends the capping is interrupted, in the illustrated embodiment, to leave a place for the direction indicator lamp 8.

The fender 2 is constituted by an upper part 10 which forms the top horizontal element of the capping and which is formed at its lateral ends with two integral downwardly directed lugs 12 and 13 and a lower part 14 which forms the lower horizontal element of the capping and which is formed at its lateral ends with two integral upwardly directed lugs 16 and 17. The two direction indicator lamps 8 and thus located between the respective pairs of lugs 12, 16 and 13, 17, which pairs of lugs each constitute a vertical lateral element of the annular capping constituting the fender 2 and which contribute significantly to the protection of the direction indicator lamps from collisions.

As will be apparent from FIG. 3 the upper fender part 10 comprises a resilient main body 20 of porous elastomeric material such as expanded polyurethane foam enclosed in a covering 22 of rubber, plastics or textile material. Similarly the lower part 14 comprises a resilient main body 24 of porous elastomeric material such as expanded polyurethane foam enclosed in a covering 26 of rubber, plastics or textile material.

It is characteristic of this invention that the bodies 20 and 24 of elastomeric material are formed with cavities for the purpose of conferring upon the fender impact response characteristics such that the fender presents relatively low rigidity when subject to collisions at low speed and against weak objects such as pedestrians, and presents a somewhat higher rigidity when subject to considerable deformations due to more energetic collisions against more solid objects.

For this purpose the upper and lower parts of the fender are both provided with a plurality of cavities 28 each of which is substantially ogival in shape with its axis of symmetry disposed parallel to the longitudinal plane of symmetry of the automobile or slightly inclined to this plane and having its base in the surface of the part which faces the bodywork of the automobile to which the fender is fitted.

the cavities 28 are shown in FIG. 2 in broken outline and particularly in FIG. 3, which represents a longitudinal section of the fender made in correspondence with two of the cavities 28 having their axes in the same vertical plane, one formed in the body 20 of the top part 10 and the other in the body 24 of the lower part 14 of the fender.

Either or both of the parts 10 and 14 of the fender 2 are also formed with throughgoing drainage channels 30 which extend through the full height of one or both of the said parts. Each such drainage channel is disposed in the rear surface of the respective part of the fender facing towards the bodywork of the automobile, the channels 30, 32 being spaced apart from each other in a transverse plane of the automobile. The two parts 10, 14 of the fender can each be provided solely with the cavities 28 or solely with drainage channels 30, 32 or with both the cavities 28 and channels 30, 32.

The drawings depict a preferred embodiment of the fender in which the ogival cavities 28 are formed in both the upper and lower parts of the fender, whilst the drainage channels 30, 32 are only two in number and are located beneath the headlamps 6 in the lower part 14 only of the fender. In particular, FIG. 4 shows a longitudinal section of the fender taken in correspondence with one of the said drainage channels, 30.

The drainage channels 30, 32 are particularly useful in the lower part of the fender, since if any foreign matter should accumulate in the central zone 4 comprised between the upper and the lower parts of the fender and obscure the headlamps, thus reducing the luminosity of the latter, such matter is removed by falling through the channels 30, 32 below the headlamps 6.

The fender is also provided with two metal reinforcements 34 and 36 disposed respectively inside the body 20 and the body 24, in correspondence substantially with their surfaces turned towards the bodywork of the automobile, which serve to confer upon the fender a sufficient rigidity and the allow it to be fitted to the bodywork of the automobile. The reinforcements 36 introduced into the part of the fender in which the drainage channels are received, do not extend across the latter and are therefore sub-divided into several separate sections.

The two parts of the fender 2 are fitted to the front end 40 of the automobile, provided with reinforcing elements 42 and 44, by means of a plurality of bolts 46, 48 spaced apart in a transverse plane, two of which are shown in FIG. 3, welded to the reinforcements 34, 36 respectively, which cooperate with corresponding nuts for fixing the fender 2 to the automobile bodywork.

Whenever the position of the direction indicator lamps is such as to allow it, the fender may be constructed in the form of an annular capping in a single piece including the pairs of lugs 12, 16 and 13, 17 so that each pair of lugs constitutes a vertical element of the capping, the said ogival cavities and the drainage channels being also formed within the said vertical elements.

A detailed description has been given of the front fender 2 of the automobile, but it will be evident that the rear fender 3 may be constructed with the same characteristics as the front one, leaving free spaces defining drainage channels beneath the tail lamp assemblies of the automobile, such as parking lamps, stop, direction indicator and license plate lamps.

What is claimed is:

1. Resilient fender for motor vehicles comprising at least one element of porous elastomeric material, in particular expanded polyurethane foam, having a flexible covering and an internal reinforcement, the fender being arranged transversely on an end surface of the motor vehicle, wherein the improvement resides in the said element having:
   a. means defining a plurality of individual, spaced apart cavities of substantially ogival form with their axes directed substantially parallel to the longitudinal plane of symmetry of the vehicle, and with their bases disposed in the surface of the element which faces the motor vehicle body in the installed position of the fender and
   b. means defining a plurality of through channels adjacent the lights of the vehicle which traverse the element over its entire height on the surface of the latter which faces towards the vehicle body in the installed position of the fender.

2. Fender as defined in claim 1, constructed substantially in the form of a substantially annular capping which covers at least the periphery of the end surface of the vehicle, said capping comprising an upper part, a lower part, and downwardly and upwardly directed lugs provided at the ends of the upper and lower parts respectively of the fender to complete the peripheral capping; said channels being formed in the lower part.

3. Vehicle fender of porous elastomeric material in the form of a substantially annular capping covering the periphery of an end surface of a vehicle, comprising upper and lower horizontal elements and two vertical lateral elements wherein the improvement comprises said elements having:
   a. means defining a plurality of individual, spaced apart cavities substantially of ogival form with their axes directed substantially parallel to the longitudinal plane of symmetry of the vehicle and with their bases facing towards the vehicle bodywork and
   b. means defining a plurality of through channels in the surface of at least one of the elements facing towards the vehicle, said channels traversing the said element over their full height and being spaced apart in a transverse plane of the vehicle adjacent the vehicle lights.

* * * * *